US012808260B2

(12) United States Patent
Greening

(10) Patent No.: US 12,808,260 B2
(45) Date of Patent: Nov. 24, 2026

(54) WINDOW BLIND FRAME

(71) Applicant: LOUVER-LITE LIMITED, Hyde (GB)

(72) Inventor: Andrew Greening, Hyde (GB)

(73) Assignee: LOUVER-LITE LIMITED, Hyde (GB)

(*) Notice: Subject to any disclaimer, the term of this patent is extended or adjusted under 35 U.S.C. 154(b) by 248 days.

(21) Appl. No.: 18/709,554

(22) PCT Filed: Nov. 10, 2022

(86) PCT No.: PCT/GB2022/052861
§ 371 (c)(1),
(2) Date: May 13, 2024

(87) PCT Pub. No.: WO2023/084230
PCT Pub. Date: May 19, 2023

(65) Prior Publication Data

US 2025/0020023 A1 Jan. 16, 2025

(30) Foreign Application Priority Data

Nov. 12, 2021 (GB) ..................................... 2116362

(51) Int. Cl.
*E06B 9/42* (2006.01)
*E06B 9/266* (2006.01)

(52) U.S. Cl.
CPC ................ *E06B 9/42* (2013.01); *E06B 9/266* (2013.01)

(58) Field of Classification Search
CPC ..... E06B 2009/2452; E06B 2009/2447; E06B 2009/2423; E06B 9/264; E06B 9/266; E06B 9/42; E06B 9/323
See application file for complete search history.

(56) References Cited

U.S. PATENT DOCUMENTS 1,482,059 A * 1/1924 Zimmer .................... E06B 9/24 160/84.06
2,607,963 A * 8/1952 Ansel ...................... E06B 9/264 160/91

(Continued)

FOREIGN PATENT DOCUMENTS

CN 213391722 U * 6/2021
EP 1727958 B1 8/2008

(Continued)

OTHER PUBLICATIONS

International Search Report and Written Opinion received in PCT/GB2022/052861 dated Mar. 7, 2023, pp. 9.

*Primary Examiner* — Johnnie A. Shablack

(74) *Attorney, Agent, or Firm* — Liang & Hennessey LLP; Brian Hennessey

(57) ABSTRACT

A window blind frame comprising a top frame element, a bottom frame element, and a pair of opposed side frame elements, wherein the frame elements are secured together via respective corner brackets; wherein the top frame element is a two part component; the bottom frame is a two-part component; wherein the window blind frame further includes an upper T-shaped bracket, a lower T-shaped bracket, and a supporting member, wherein the upper T-shaped bracket connects the two top frame components and an upper end of the supporting member; and wherein the lower T-shaped bracket connects the two bottom frame elements and a lower end of the supporting member.

14 Claims, 3 Drawing Sheets

(56) References Cited

U.S. PATENT DOCUMENTS

| | | | | | |
|---|---|---|---|---|---|
| 3,298,424 | A * | 1/1967 | Griffin | E06B 3/921 428/101 |
| 6,571,851 | B1 * | 6/2003 | Jelic | E06B 9/262 160/90 |
| 6,607,020 | B1 * | 8/2003 | Jensen | E06B 9/30 403/403 |
| 6,736,185 | B2 * | 5/2004 | Smith | E06B 9/54 160/107 |
| 7,000,670 | B2 * | 2/2006 | Kwon | E06B 9/264 160/107 |
| 7,681,618 | B2 * | 3/2010 | Nicolosi | E06B 9/264 160/241 |
| 8,074,698 | B2 * | 12/2011 | Allsopp | E06B 9/264 160/369 |
| 11,866,990 | B2 * | 1/2024 | Greening | E06B 9/264 |
| 2007/0267152 | A1 * | 11/2007 | Fan | E06B 9/262 160/84.06 |
| 2007/0277937 | A1 * | 12/2007 | Su | E06B 9/264 160/98 |
| 2025/0020023 | A1 * | 1/2025 | Greening | E06B 9/42 |
| 2025/0198233 | A1 * | 6/2025 | Greening | E06B 9/266 |

FOREIGN PATENT DOCUMENTS

| | | | |
|---|---|---|---|
| WO | 2018055416 | A1 | 3/2018 |
| WO | 2020035613 | A1 | 2/2020 |
| WO | 2020099343 | A1 | 5/2020 |

* cited by examiner

WINDOW BLIND FRAME

CROSS-REFERENCE TO RELATED APPLICATIONS

The present application is a national phase application of PCT Application No. PCT/GB2022/052861, filed Nov. 10, 2022, entitled "WINDOW BLIND FRAME", which claims the benefit of Great Britain Patent Application No. 2116362.1, filed Nov. 12, 2021, each of which is incorporated by reference in its entirety.

BACKGROUND OF THE INVENTION

1. Field of the Invention

The present invention relates to window blind frame which can be secured to an architectural opening, such as a window, and which can carry a deployable window blind apparatus.

2. Description of the Related Art

Window blinds which are located within frames and then secured to a window are known. Such window blind arrangements are described, for example, in EP1727958 and WO2020/035613.

Typically, the frames of such window blinds are secured to the window frame via mechanical fixings, such as screws, via clips which are secured between the glazing panel and a rubber gasket of the window, or via a magnetic coupling.

However, it has been noted that when known window blind frame systems are secured to windows having a relatively large width dimension and a window blind is coupled to the frame, the top frame element of the frame may sag or droop.

The present invention sets out to address this problem.

SUMMARY OF THE INVENTION

According to a first aspect of the invention, there is provided a window blind frame for attachment to an architectural opening, such as a window, wherein the window blind frame comprises a top frame element, a bottom frame element, and a pair of opposed side frame elements, wherein the frame elements are secured together via respective corner brackets; wherein the top frame element is a two part component; the bottom frame is a two-part component; wherein the window blind frame further includes an upper T-shaped bracket, a lower T-shaped bracket, and a supporting member, wherein the upper T-shaped bracket connects the two top frame components and an upper end of the supporting member; and wherein the lower T-shaped bracket connects the two bottom frame elements and a lower end of the supporting member.

The invention thus provides a supporting member which supports or braces the top frame element and prevents or reduces any sagging or drooping associated with the top frame element.

The skilled person will appreciate that the window blind frame is a substantially rectangular frame which includes four corner brackets, wherein first and second upper corner brackets couple together the ends of the top frame element with the respective side frame elements; and wherein first and second lower corner brackets couple together the ends of the bottom frame element with the respective side elements.

The window blind frame may be secured to a substrate (e.g. a window frame) via any known means. For example, the window blind frame may include one or more mechanical fixings, one or more fixing clips (e.g. as described in EP1727958) or one part of a magnetic coupling (e.g. as described in WO2020/035613). Thus, the window blind frame of the present invention is separate from a window frame which secures therein one or more glazing panels.

In an embodiment of the invention, each of the top frame element components defines a respective channel and respective arm portions of the upper T-shaped bracket are received within the top frame element channels; and wherein each of the bottom frame element components defines a respective channel and respective arm portions of the lower T-shaped bracket are received within the bottom frame element channels.

The top frame element channels may extend along the entire length of the top frame element (i.e. both components together) or they may only extend along a part of the top frame element components, for example, the ends of the components that are disposed adjacent to each other. Similarly, the bottom frame element channels may extend along the entire length of the bottom frame element (i.e. both components together) or they may only extend along a part of the bottom frame element components, for example, the ends of the components that are disposed adjacent to each other.

The arms of the upper and lower T-shaped brackets suitably form a friction fit or snap fit within the respective channels of the top frame element and the bottom frame element. However, alternative methods of securing the T-shaped brackets to the top frame elements and bottom frame elements are within the scope of the invention. For example, the upper and lower T-shaped brackets may be secured to the respective top and bottom frame elements via one or more mechanical fixings, such as, for example, screws.

The supporting member may also define an elongate channel along its length or parts of its length and respective arms of the upper and lower T-shaped brackets may be received within the channel or respective ones of the channels.

Again, the arms of the upper and lower T-shaped brackets may form a friction fit or a snap fit within the or each elongate channel of the supporting member. Alternatively, the upper and lower T-shaped brackets may be secured to the or each channel defined by the supporting member via one or more mechanical fixings, such as, for example, screws.

In order to provide a more pleasing appearance for the window blind frame, the T-shaped brackets may be covered. Accordingly, in an embodiment of the invention, the frame further comprises an upper cover plate and a lower cover plate, wherein the upper cover plate covers the upper T-shaped bracket and the lower cover plate covers the lower T-shaped bracket.

For ease of assembly, the upper and lower cover plates may be coupled to the respective T-shaped bracket via a friction fit coupling or a snap fit coupling. However, as noted above, the covers may alternatively be secured to the respective T-shaped bracket via one or more mechanical fixings. In a further alternative embodiment, the T-shaped bracket and the associated cover plate may form a single, integral component. For example, the T-shaped bracket and the cover plate may be moulded as a single component.

According to a second aspect of the invention, there is provided a window blind apparatus comprising a window blind frame as defined anywhere herein in connection with the first aspect of the invention, a first deployable window blind, and a second deployable window blind; wherein the first and second deployable window blinds each comprises a blind substrate which is deployable from a headrail or a roller tube; the headrail or roller tube of the first deployable window blind is secured to a first portion of the window blind frame defined between a first one of the side frame elements and the supporting member; and the headrail or roller tube of the second deployable window blind is secured to a second portion of the window blind frame defined between a second one of the side frame elements and the supporting member.

The skilled person will appreciate that the supporting member effectively divides the window blind frame into two separate blind frame portions. A first deployable window blind may therefore be carried by the first portion of the window blind frame, and a second deployable window blind may be carried by the second portion of the window blind frame.

The side frame elements and the supporting member may each define cover portions which extend perpendicularly relative to a longitudinal axis of the side frame elements and the supporting member. These cover portions suitably cover respective side edge portions of the deployable window blinds. In this way, light strike between the side edge portions of the blind substrate and the sides of the window blind frame is prevented.

In an embodiment of the invention, each of the first and second deployable window blinds includes a blind substrate which is deployable from a respective roller tube and the roller tubes are secured to the respective portions of the frame via roller tube supports. For example, the roller tube supports may be coupled to the top frame element. Alternatively, the roller tube supports may be coupled to the side frame elements and the supporting member. In a further alternative embodiment, each of the upper corner brackets define a first one of the roller tube supports and a second one of the roller tube supports is coupled to the top frame element or to the supporting member.

In an alternative embodiment of the invention, each of the first and second deployable window blinds includes a blind substrate which is deployable from a respective headrail and the headrails are secured to the respective portions of the frame via headrail supports. In such embodiments, each of the blind substrates may be formed from a single blind substrate element (e.g., in the form of a pleated blind or a Roman blind) or each of the blind substrates may be formed from a plurality of blind substrate elements (for example, a vertical blind or a Venetian blind). In such embodiments, each blind substrate element may define a longitudinal axis and is arranged to move laterally and to be rotated about its longitudinal axis. Thus, the longitudinal axis may be a vertical axis (e.g., in the case of a vertical blind) or a horizontal axis (e.g., in the case of a Venetian blind). In the context of the present invention, the term "laterally" means displacement of the blind substrate element in a direction which is perpendicular to its longitudinal axis. In other words, displacement along the headrail or towards/away from the headrail. Thus, each blind substrate may be arranged for displacement along the respective headrail or towards/away from the headrail.

Each of the first and second window blinds may be operated separately (i.e. independently) or they may be arranged for simultaneous operation. Thus, the first deployable window blind may include a first operating apparatus, and the second deployable window blind may include a second operating apparatus.

The skilled person will appreciate that a window blind frame may include two or more supporting members, wherein each supporting member is secured to the window blind frame via a respective pair of T-shaped brackets. Thus, the window blind frame may be divided into two framed portions where the window blind frame includes one supporting member, or it may be divided into three framed portions where the window blind frame includes two supporting members. It will be appreciated that the window blind frame may include "n" number of supporting members, wherein the window blind frame is divided into "n+1" framed portions.

Window blind apparatus are often sold in kit form for installation on site. Thus, according to a third aspect of the invention, there is provided a window blind apparatus in kit form, wherein the kit includes window blind frame components including a two-part top frame element, a two-part bottom frame element, a pair of opposed side frame elements, four corner brackets, an upper T-shaped bracket, a lower T-shaped bracket and a supporting member; a first deployable window blind; and a second deployable window blind.

The optional features described herein with respect to the first and second aspects of the invention apply equally to the third aspect of the invention.

According to a fourth aspect of the invention, there is provided coverable window assembly, wherein the window assembly includes a window frame; one or more glazing panels disposed within the window frame and secured thereto; and a window blind apparatus as defined anywhere herein in connection with the second aspect of the invention; wherein the window blind frame of the window blind apparatus is coupled to the window frame. Again, the optional features described herein with respect to the first and second aspects of the invention apply equally to the fourth aspect of the invention.

The skilled person will appreciate that the features described and defined in connection with the aspect of the invention and the embodiments thereof may be combined in any combination, regardless of whether the specific combination is expressly mentioned herein. Thus, all such combinations are considered to be made available to the skilled person.

BRIEF DESCRIPTION OF THE DRAWINGS

An embodiment of the invention will now be described, by way of example only, with reference to the accompanying drawings in which.

DETAILED DESCRIPTION

For the avoidance of doubt, the skilled person will appreciate that in this specification, the terms "up", "down", "front", "rear", "upper", "lower", "width", etc. refer to the orientation of the components as found in the example when installed for normal use as shown in the Figures.

Figure 1:
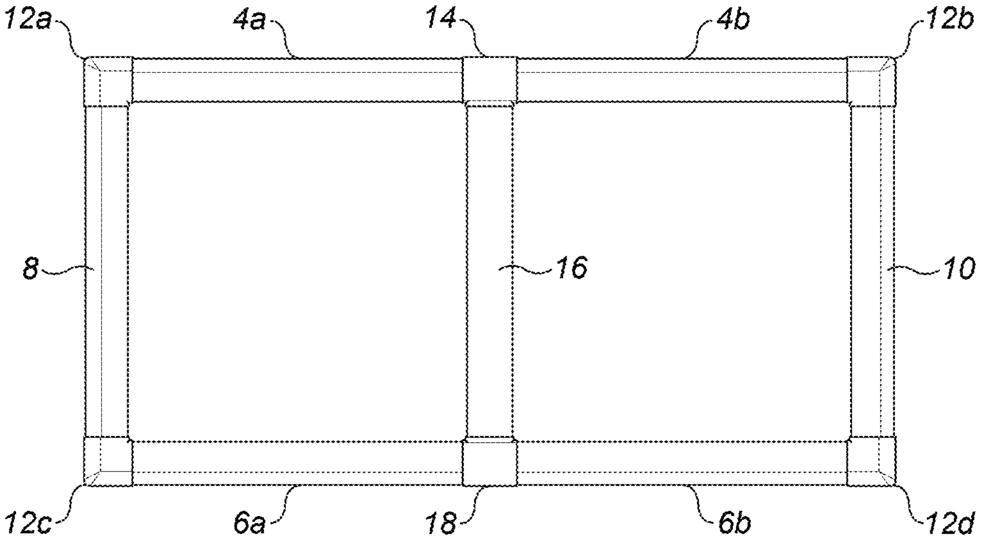
FIG. 1 shows a front elevational view of an embodiment of a window blind frame according to the first aspect of the invention.
Figure 1A:
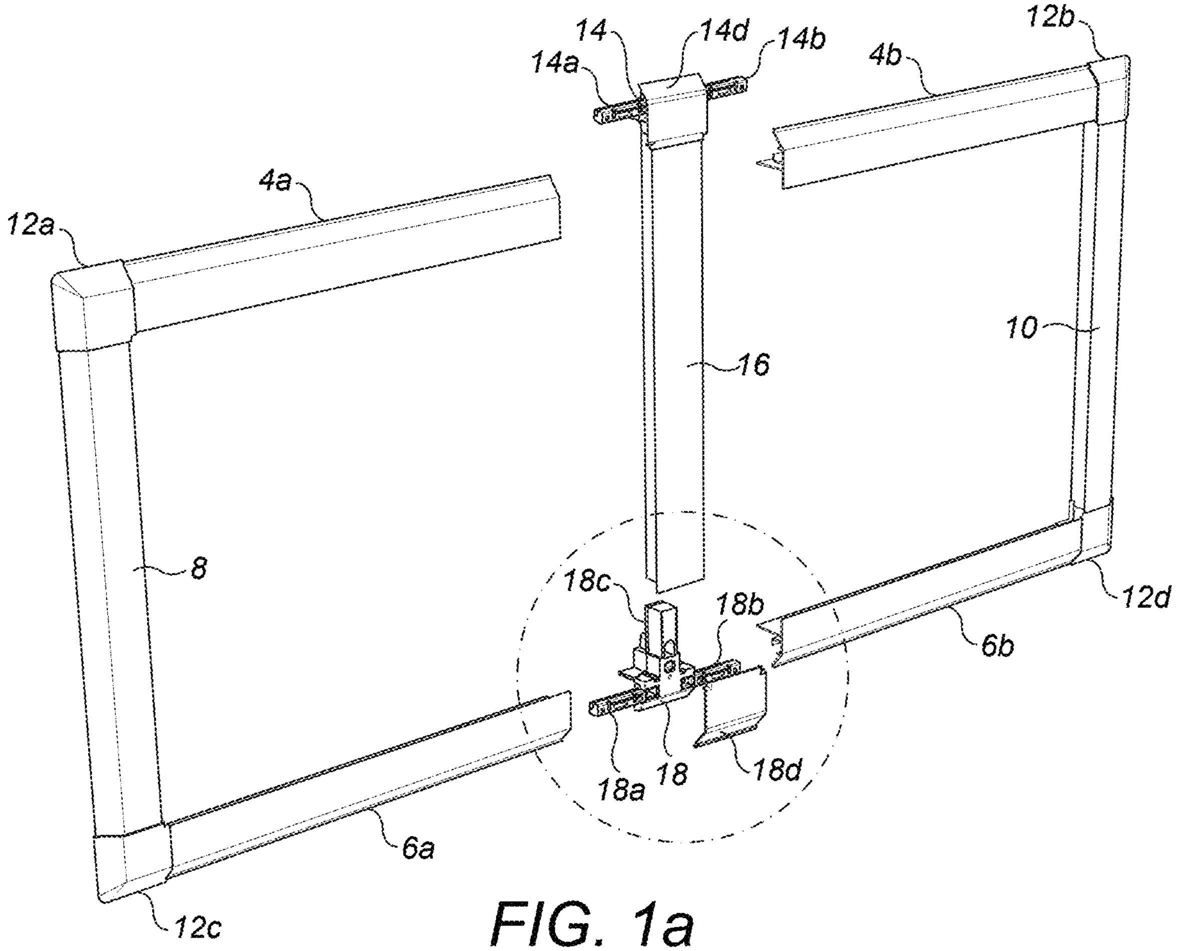
FIG. 1*a* shows a perspective view of the window blind frame shown in FIG. 1 with the supporting member and T-shaped brackets exploded.

FIGS. 1 and 1*a* show a window blind frame 2 which comprises a two-part top frame element 4*a*, 4*b*; a two-part bottom frame element 6*a*, 6*b*, a first side frame element 8 and a second side frame element 10. The top frame element 4*a* is connected to the first side frame element 8 via a first corner bracket 12*a*; the top frame element 4*b* is connected to the second frame element 10 via a second corner bracket 12*b*; the bottom frame element 6*a* is connected to the first side frame element 8 via a third corner bracket 12*c*; and the bottom frame element 6*b* is connected to the second side frame element 10 via a fourth corner bracket 12*d*.

The frame elements 4*a*, 4*b*, 6*a*, 6*b*, 8, 10 each have a known profile, such as the profiles shown and described in WO2018/055416 and WO2020/099343. Similarly, the corner brackets 12*a*, 12*b*, 12*c*, 12*d* may be any L-shaped bracket that engages with the respective frame element profiles, for example, the corner brackets shown in WO2018/055416 or WO2020/099343.

An upper T-shaped bracket 14 connects together the two parts 4*a*, 4*b* of the top frame element. It also connects an upper end of a supporting member 16 to the top frame element 4*a*, 4*b*. Similarly, a lower T-shaped bracket 18 connects together the two parts 6*a*, 6*b* of the bottom frame element. It also connects a lower end of the supporting member 16 to the bottom frame element 6*a*, 6*b*.

As shown in FIG. 1*a*, the T-shaped brackets 14, 18 each include three projecting arms. The upper T-shaped bracket 14 includes a pair of parallel arms 14*a*, 14*b* and a perpendicular arm (not shown). The lower T-shaped bracket 18 includes a pair of parallel arms 18*a*, 18*b* and a perpendicular arm 18*c*. The two parallel arms 14*a*, 14*b*, 18*a*, 18*b* are received within respective channels defined by the top and bottom frame elements 4*a*, 4*b*, 6*a*, 6*b*. The two perpendicular arms 18*c* are received within a channel defined by the supporting member 16.

The arms 14*a*, 14*b*, 18*a*, 18*b*, 18*c* form a friction fit or a snap fit within the respective channel defined by the top frame element 4*a*, 4*b*, bottom frame element 6*a*, 6*b* and supporting member 16.

Figure 2:
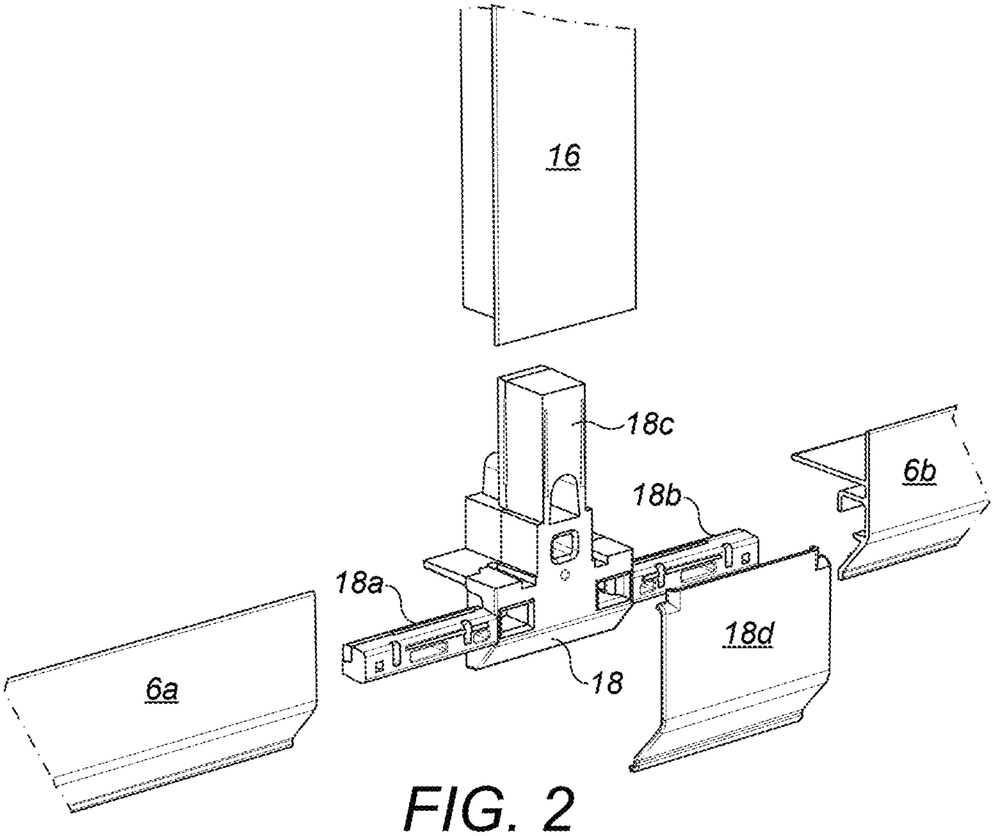
FIG. 2 shows an exploded view of a T-shaped bracket, the supporting member and the bottom frame element.

FIG. 2 shows an enlarged view of the lower T-shaped bracket 18, the bottom frame element 6*a*, 6*b* and the supporting member 16. As shown in FIG. 2, the lower T-shaped bracket 18 further includes a cover plate 18*d* which covers the T-shaped bracket 18 and portions of the supporting member 16, the first part 6*a* of the bottom frame element and the second part 6*b* of the bottom frame element. The upper T-shaped bracket includes a corresponding upper cover plate 14*d*.

Figure 3A:
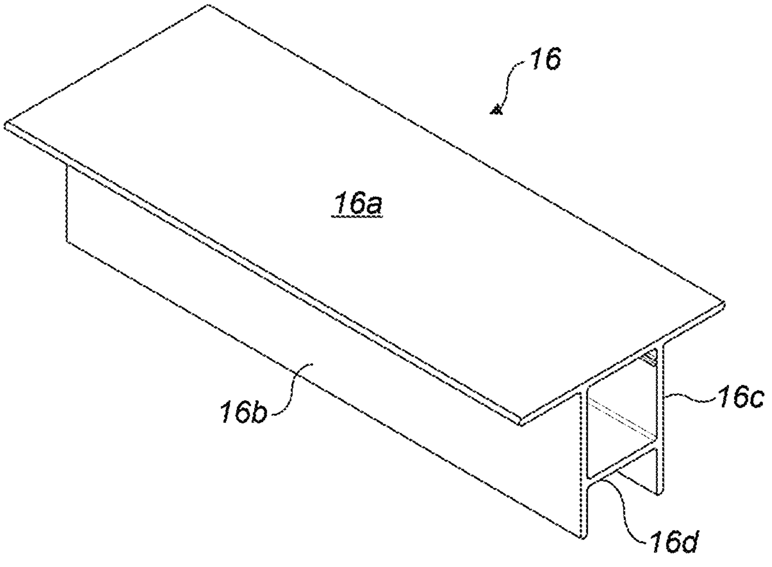
FIG. 3*a* shows a perspective view of a portion of the supporting member.
Figure 3B:
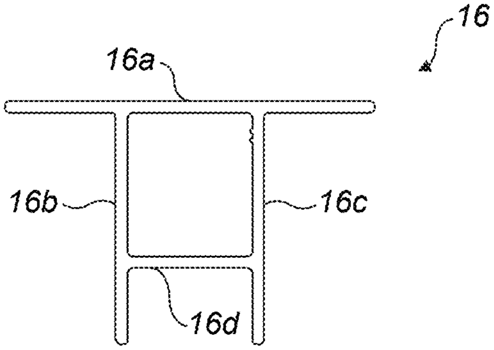
FIG. 3*b* shows a cross-sectional view through the supporting member shown in FIG. 3*a*.

FIGS. 3*a* and 3*b* show the supporting member 16 in more detail. The supporting member 16 includes a top wall 16*a*, a pair of opposed side walls 16*b*, 16*c* which project from one face of the top wall 16*a* and a bottom wall 16*d* which is spaced from the top wall 16*a* and joins the opposed side walls 16*b*, 16*c*. A portion of the top wall 16*a*, portions of the opposed side walls 16*b*, 16*c* and the bottom wall 16*d* together define a rectangular channel which receives therein the perpendicular arms 18*c* of the T-shaped brackets 14, 18.

The top wall 16*a* of the supporting member 16 extends beyond the opposed side walls 16*b*, 16*c* to define cover portions either side of the side walls 16*b*, 16*c*. In use, the cover portions of the top wall 16*a* cover the respective side edge portions of blind substrates (not shown) carried by the frame 2 on either side of the supporting member 16. In this way, light strike between the blind substrates and the supporting member 16 is minimized or prevented.

Figure 4:
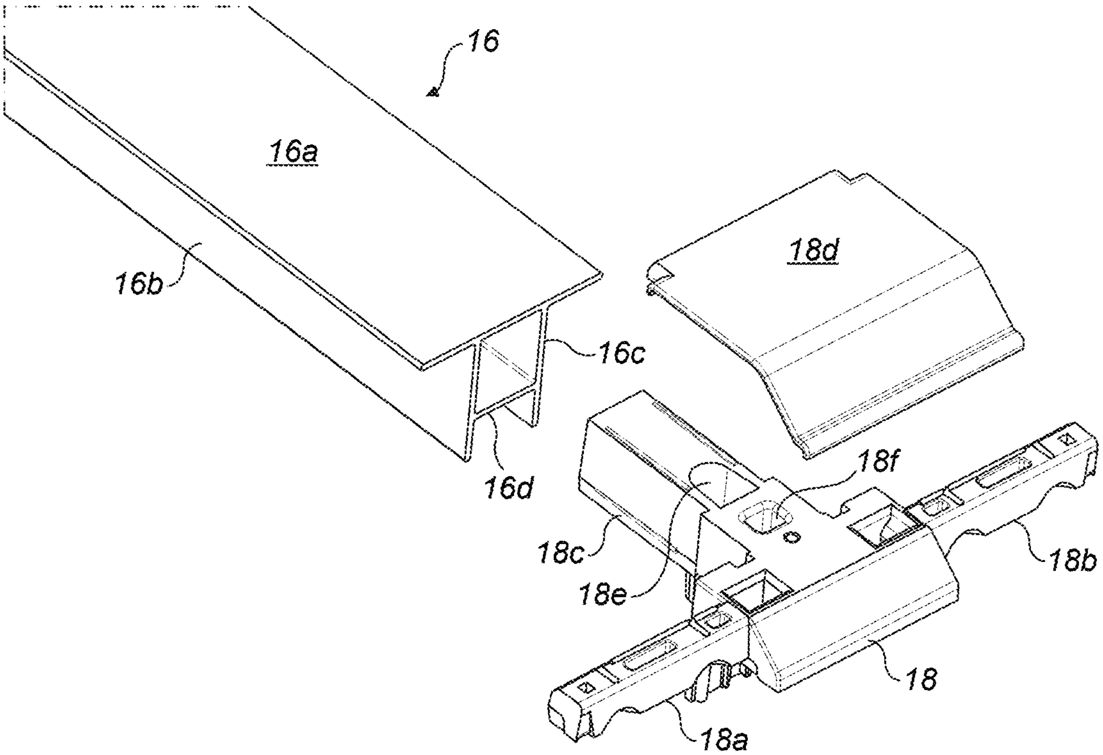
FIG. 4 shows a perspective view of the T-shaped bracket, the supporting member and a cover plate.

FIG. 4 shows the perpendicular arm 18*c* of the lower T-shaped bracket 18 in more detail. The perpendicular arm 18*c* has a rectangular cross-section and is sized to form a friction fit within the rectangular channel defined by the top wall 16*a*, portions of the opposed side walls 16*b*, 16*c* and the bottom wall 16*d*. As also shown in FIG. 4, the lower T-shaped bracket defines a first aperture 18*e* and a second aperture 18*f*. These apertures 18*e*, 18*f* receive therein corresponding projections (not shown) carried by the cover plate 18*d*, such that the projections form a friction fit within the corresponding apertures 18*e*, 18*f*. The upper T-shaped bracket 14 has a corresponding arrangement, wherein the upper cover plate 14*d* is secured to the T-shaped bracket 14 via a similar friction coupling.

The invention claimed is:

1. A window blind frame for attachment to a window frame, comprising:
- a top frame element;
- a bottom frame element; and
- a pair of opposed side frame elements;
- wherein the frame elements are secured together via respective corner brackets;
- wherein the top frame element is a two part component;
- wherein the bottom frame is a two-part component;
- wherein the window blind frame further includes an upper T-shaped bracket, a lower T-shaped bracket, and a supporting member;
- wherein the upper T-shaped bracket connects the two top frame components and an upper end of the supporting member;
- wherein the lower T-shaped bracket connects the two bottom frame elements and a lower end of the supporting member;
- wherein the window blind frame is configured to be attached to the window frame via one or more mechanical fixings; and
- wherein the window blind frame comprises a first blind disposed on a first side of the supporting member and a second blind disposed on a second side of the supporting member, the first side being opposite the second side.

2. The window blind frame according to claim 1, wherein each of the top frame element components defines a respective channel and respective arm portions of the upper T-shaped bracket are received within the top frame element channels; and wherein each of the bottom frame element components defines a respective channel and respective arm portions of the lower T-shaped bracket are received within the bottom frame element channels.

3. The window blind frame according to claim 2, wherein the arms of the upper and lower T-shaped brackets form a friction fit or snap fit within the respective channels of the top frame element and the bottom frame element.

4. The window blind frame according to claim 1, wherein the supporting member defines an elongate channel along its length and respective arms of the upper and lower T-shaped brackets are received within the channel.

5. The window blind frame according to claim 4, wherein the arms of the upper and lower T-shaped brackets form a friction fit or a snap fit within the elongate channel of the supporting member.

6. The window blind frame according to claim 1, wherein the frame further comprises an upper cover plate and a lower cover plate, wherein the upper cover plate covers the upper T-shaped bracket and the lower cover plate covers the lower T-shaped bracket.

7. The window blind frame according to claim 6, wherein the upper cover plate and the lower cover plate are coupled to the respective T-shaped bracket via a friction fit coupling or a snap fit coupling.

8. The window blind frame according to claim 6, wherein the upper cover plate and the lower cover plate are integrally formed with the respective T-shaped brackets.

9. The window blind frame according to claim 1, wherein:

the window blind frame includes two or more supporting members;

the top frame element is a multi-part component; and the bottom frame is a multi-part component and each supporting member is coupled to the top frame element and the bottom frame element via a respective pair of upper and lower T-shaped brackets.

10. A window blind apparatus comprising:

a window blind frame;

a first deployable window blind; and a second deployable window blind;

wherein the window blind frame comprises a top frame element, a bottom frame element, and a pair of opposed side frame elements;

wherein the frame elements are secured together via respective corner brackets;

wherein the top frame element is a two part component;

wherein the bottom frame is a two-part component;

wherein the window blind frame further includes an upper T-shaped bracket, a lower T-shaped bracket, and a supporting member;

wherein the upper T-shaped bracket connects the two top frame components and an upper end of the supporting member;

wherein the lower T-shaped bracket connects the two bottom frame elements and a lower end of the supporting member;

wherein the first and second deployable window blinds each comprises a blind substrate which is deployable from a headrail or a roller tube;

wherein the headrail or roller tube of the first deployable window blind is secured to a first portion of the window blind frame defined between a first one of the side frame elements and the supporting member;

wherein the headrail or roller tube of the second deployable window blind is secured to a second portion of the window blind frame defined between a second one of the side frame elements and the supporting member;

wherein the window blind frame is configured to be attached to the window frame via one or more mechanical fixings; and wherein the window blind frame comprises a first blind disposed on a first side of the supporting member and a second blind disposed on a second side of the supporting member, the first side being opposite the second side.

11. The window blind apparatus according to claim 10, wherein each of the first and second deployable window blinds includes a blind substrate which is deployable from a respective roller tube and the roller tubes are secured to the respective portions of the frame via roller tube supports.

12. The window blind apparatus according to claim 10, wherein each of the first and second deployable window blinds includes a blind substrate which is deployable from a respective headrail or via a respective headrail and the headrails are secured to the respective portions of the frame via headrail supports.

13. The window blind apparatus according to claim 12, wherein each of the blind substrates is formed from a plurality of blind substrate elements, wherein each blind substrate element defines a longitudinal axis and is arranged to move laterally and to be rotated about its longitudinal axis.

14. The window blind apparatus according to claim 10, wherein the first deployable window blind includes a first operating apparatus, and the second deployable window blind includes a second operating apparatus.

* * * * *